United States Patent
Cui

(10) Patent No.: US 11,501,299 B2
(45) Date of Patent: Nov. 15, 2022

(54) METHOD FOR SELLING COMMODITY, VENDING MACHINE AND STORAGE MEDIUM

(71) Applicant: BAIDU ONLINE NETWORK TECHNOLOGY (BEIJING) CO., LTD., Beijing (CN)

(72) Inventor: Lei Cui, Beijing (CN)

(*) Notice: Subject to any disclaimer, the term of this patent is extended or adjusted under 35 U.S.C. 154(b) by 137 days.

(21) Appl. No.: 16/663,584

(22) Filed: Oct. 25, 2019

(65) Prior Publication Data

US 2020/0134632 A1    Apr. 30, 2020

(30) Foreign Application Priority Data

Oct. 29, 2018 (CN) .......................... 201811271116.3

(51) Int. Cl.
*G06Q 20/40* (2012.01)
*G06F 3/01* (2006.01)
*G07F 11/02* (2006.01)
*G07F 9/02* (2006.01)
*G06V 40/19* (2022.01)

(52) U.S. Cl.
CPC ....... *G06Q 20/40145* (2013.01); *G06F 3/013* (2013.01); *G06F 3/017* (2013.01); *G06V 40/19* (2022.01); *G07F 9/023* (2013.01); *G07F 11/02* (2013.01)

(58) Field of Classification Search
None
See application file for complete search history.

(56) References Cited

U.S. PATENT DOCUMENTS 5,912,721 A    6/1999 Yamaguchi et al.
9,576,285 B2 *    2/2017 Zhou ................ G06K 19/06112
(Continued)

FOREIGN PATENT DOCUMENTS

CN    102831486 A    12/2012
CN    106897921 A    6/2017
(Continued)

OTHER PUBLICATIONS

"Tobii Pro Glasses Analyzer User's Manual, Jul. 2016, 33-35" (Year: 2016).*

(Continued)

*Primary Examiner* — Kito R Robinson
*Assistant Examiner* — Toan Duc Bui
(74) *Attorney, Agent, or Firm* — Fay Sharpe LLP

(57) ABSTRACT

The embodiments of the present disclosure provide a method for selling a commodity, a vending machine and a storage medium. The method includes: acquiring an image of eyes of a user, determining based on the image of eyes a gaze point of the user within a commodity displaying plane matching a vending machine; determining, based on position coordinates of at least two commodities in the commodity displaying plane and the gaze point, an expected commodity corresponding to the user; providing commodity indication information of the expected commodity to the user; and in response to detecting purchase confirmation information fed back by the user for the commodity indication information, guiding the user to use at least one biological characteristic to finish payment for the expected commodity.

9 Claims, 2 Drawing Sheets

(56) References Cited

U.S. PATENT DOCUMENTS

| | | |
|---|---|---|
| 2003/0130762 A1 | 7/2003 | Tomassi |
| 2011/0144801 A1 | 6/2011 | Selker et al. |
| 2013/0178287 A1* | 7/2013 | Yahav .................... G02B 27/01 463/32 |
| 2015/0324568 A1 | 11/2015 | Publicover et al. |
| 2016/0037251 A1* | 2/2016 | Daniels .................. G10L 15/22 381/74 |
| 2017/0116587 A1 | 4/2017 | Chen |
| 2017/0160798 A1 | 6/2017 | Lanman et al. |
| 2017/0293354 A1 | 10/2017 | Lu et al. |
| 2018/0121925 A1* | 5/2018 | Gaikar .................... H04W 4/80 |
| 2018/0349869 A1* | 12/2018 | Glaser .................... G06K 7/087 |

FOREIGN PATENT DOCUMENTS

| | | |
|---|---|---|
| CN | 107247759 A | 10/2017 |
| CN | 107563762 A | 1/2018 |
| CN | 207074475 U | 3/2018 |
| CN | 108615296 A | 10/2018 |
| CN | 108711066 A | 10/2018 |
| KR | 20170084900 A | 7/2017 |
| WO | 2017146991 A1 | 8/2017 |
| WO | 2018061008 A1 | 4/2018 |

OTHER PUBLICATIONS

Office Action for Chinese Application No. 201811271116.3, dated Apr. 23, 2020.
Office Action for European Application No. EP 19205721.4, dated Apr. 1, 2020.
Ling et al., "Application of Interactive Multi-Biometrics Recognition on E-Commerce", Telecommunication Science, 6 pages. Abstract.
"Research of Remote Gaze Tracking Technique with Near IR Illumination", 101 pages.
Behe et al., "Practical Field Use of Eye-Tracking Devices for Consumer Research in the Retail Environment", HorTechnology, Aug. 23, 2013, 8 pages.
Office Action for EP Application No. 19 205 721.4, dated Dec. 3, 2021, 10 pages.

* cited by examiner

METHOD FOR SELLING COMMODITY, VENDING MACHINE AND STORAGE MEDIUM

This application is based on and claims priority of Chinese Patent Application 201811271116.3, filed on Oct. 29, 2018, the entire contents of which are incorporated herein by reference.

FIELD

The present disclosure relates to a technology field of vending machines, more particularly to a method for selling a commodity, a vending machine and a storage medium.

BACKGROUND

With development of industrial technology and Internet of Things technology, a vending machine configured as a new commercial retail form became applied more and more widely.

Recently, when the conventional vending machine is used, it is required for the user to manually input or select a desired commodity and to finish payment for the commodity by inserting coins or scanning a QR code through a third-party software, such as WeChat or Alipay.

During a process of implementing this present disclosure by an inventor, the inventor find the following drawback in the related art: in a scenario that the user holds other items in hand such that it is inconvenient for the user to manually operate the vending machine, the conventional vending machine cannot provide convenient and quick commodity sell service to the user. Meanwhile, a payment mode of the conventional vending machine needs the user to carry cash or coin or to download applications such as Wechat or Alipay via a mobile device so as to realize on-site payment, the procedure is tedious and it takes long time to realize on-site payment, which brings inconvenience to the user, thus leading to a poor experience for the user.

DISCLOSURE

Embodiments of the present disclosure provide a method and an apparatus for selling a commodity, a vending machine and a storage medium, which extends an application scenario of the vending machine and improves a convenience of the vending machine and a user experience.

In a first aspect of the present disclosure, embodiments of the present disclosure provide a method for sell a commodity, including: acquiring an image of eyes of a user, determining based on the image of eyes a gaze point of the user within a commodity displaying plane matching a vending machine; determining, based on position coordinates of at least two commodities in the commodity displaying plane and the gaze point, an expected commodity corresponding to the user; providing commodity indication information of the expected commodity to the user; and in response to detecting purchase confirmation information fed back by the user for the commodity indication information, guiding the user to use at least one biological characteristic to finish payment for the expected commodity.

In a second aspect of the present disclosure, embodiments of the present disclosure provide an apparatus for selling a commodity, including: a first determining module, configured to acquire an image of eyes of a user and to determine based on the image of eyes a gaze point of the user within a commodity displaying plane matching a vending machine; a second determining module, configured to determine, based on position coordinates of at least two commodities in the commodity displaying plane and the gaze point, an expected commodity corresponding to the user; a first information providing module, configured to provide commodity indication information of the expected commodity to the user; and a payment module, configured to, in response to detecting purchase confirmation information fed back by the user for the commodity indication information, guide the user to use at least one biological characteristic to finish payment for the expected commodity.

In a third aspect of the present disclosure, embodiments of the present disclosure provide a vending machine, including one or more processors and a memory for storing one or more programs. When the one or more programs are executed by the one or more processors, the one or more processors are caused to perform the method according to embodiments of the first aspect.

In a fourth aspect, embodiments of the present disclosure provide a computer-readable storage medium having a computer program stored thereon. When the computer program is executed by a processor, the method according to embodiments of the first aspect is performed.

In the embodiments of the present disclosure, based on the gaze point of the user within the commodity displaying plane matching the vending machine determined according to the acquired images of eyes and based on the position coordinates of the commodities in the commodity displaying plane, the expected commodity corresponding to the user is determined and the matched commodity indication information is provided to the user; if the purchase confirmation information fed back by the user is detected, the user is guided to use at least one biological characteristic to finish payment for the expected commodity. In this way, the problem that the vending machine requires an inconvenient transaction procedure and a tedious payment mode is solved, hand actions of the user when operating the vending machine may be reduced to the maximum extent and a user purchase mode based on the vending machine is optimized, such that application scenarios of the vending machine may be extended to satisfy requirements of the user on the vending machine under a special application scenario.

EMBODIMENTS OF THE PRESENT DISCLOSURE

Figure 1:
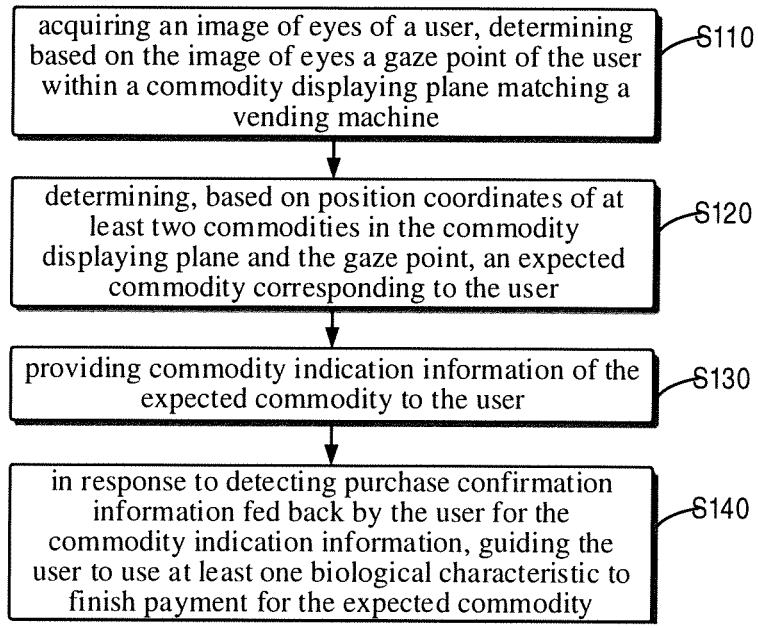
FIG. 1 is a flow chart of a method for selling a commodity according to a first embodiment of the present disclosure.

For a clear description of objectives, technical solutions and advantageous of the present disclosure, reference will be made in detail to describe embodiments of the present disclosure. It should be noted that, the embodiments described herein with reference to drawings are used to generally explain the present disclosure, rather than limiting the present disclosure.

In addition, it should also be noted that, for convenience of the description, the accompany drawings illustrate parts rather than all contents relative to the present disclosure. Before the exemplary embodiments are described in detail, it should be noted that some exemplary embodiments are described as processing or method in a form of a flow chart. Although the operations (or steps) illustrated in the flow chart are described as a processing in a certain order, some operations can be performed concurrently, concomitantly or simultaneously. In addition, the order of the operations may be re-arranged. When the operations have been accomplished, the processing may be finished. Additional steps or acts which are not illustrated in the drawings may be included. The processing may correspond to a method, a function, a regulation, a subroutine, a subprogram and the like.

First Embodiment

FIG. 1 is a flow chart of a method for selling a commodity according to the first embodiment of the present disclosure. The method in this embodiment may be applicable to a case of providing convenient commodity purchase service for a user. The method may be performed by an apparatus for selling a commodity. The apparatus may be implemented by hardware and/or software, and integrated in a vending machine and applied cooperatively with a client for providing a payment function. As illustrated in FIG. 1, the method may include the following steps.

At block S101, an image of eyes of a user is acquired, and based on the image of eyes a gaze point of the user within a commodity displaying plane matching a vending machine is determined.

It should be understood that, when the user purchases the commodity using the vending machine, if the user holds items in both hands, it is inconvenient for the user to manually operate the vending machine, for example selecting the commodity or inserting cashes. In order to avoid the manual operation of the user during purchasing the commodity, in embodiments of the present disclosure, the gaze point of the user within the commodity displaying plane of the vending machine can be used to help the user to select the commodity. In detail, the vending machine may acquire the image of eyes of the user via an image processing device and determine the gaze point of the user within the commodity displaying plane matching the vending machine based on the image of eyes.

At block S120, based on position coordinates of at least two commodities in the commodity displaying plane and the gaze point, an expected commodity corresponding to the user is determined.

The expected commodity may be a commodity desired by the user and determined by the vending machine predicting based on the gaze point of the user.

Accordingly, after determining the gaze point of the user within the commodity displaying plane matching the vending machine, the vending machine may determine the expected commodity corresponding to the user in combination with the position coordinates of respective commodities of the vending machine within the commodity displaying plane. In other words, when the gaze point of the user matches the position coordinate of a commodity, the commodity can be determined as the expected commodity of the user.

At block S130, commodity indication information of the expected commodity is provided to the user.

The commodity indication information may be information for indicating the commodity, for example the commodity indication information may include but be not limited to introduction of a commodity or information for indicating a position of the commodity.

In this embodiment of the present disclosure, after determining the expected commodity corresponding to the user, the vending machine may provide the commodity indication information of the expected commodity to the user. If the commodity indication information includes the introduction of the expected commodity, the user may sufficiently understand detail information of the expected commodity. If the commodity indication information includes the information for indicating the position of the expected commodity, the user may intuitively understand the purchase object.

In an alternative embodiment of the present disclosure, providing commodity indication information of the expected commodity to the user may include: acquiring commodity description information of the expected commodity, constructing based on the commodity description information the commodity indication information; and providing the commodity indication information to the user via speech broadcasting.

In detail, the vending machine may generate the corresponding commodity indication information based on the commodity description information corresponding to the expected commodity stored in background. The commodity description information may be detail introduction information of the commodity, including but being not limited to a name of the commodity, a price of the commodity, a special discount and a position stored in the vending machine or the like. The vending machine may provide the commodity description information to the user via speech broadcasting, such that the user may sufficiently understand detail information of the expected commodity.

In an alternative embodiment of the present disclosure, providing the commodity indication information of the expected commodity to the user may include: determining position recognition information of a state indicator light matching the expected commodity; and lightening the state indicator light matching the position recognition information to generate the commodity indication information for providing to the user.

The state indicator light may indicate the commodity.

In embodiments of the present disclosure, alternatively, the position of the commodity may be provided to the user as the commodity indication information. In detail, the vending machine may determine the position recognition information of the state indicator light corresponding to the expected commodity based on the positions of the commodities stored in background, and lighten the state indicator light corresponding to the position recognition information so as to generate the commodity indication information for providing to the user. The state indicator light may indicate the commodity by flickering for a while or in a regular mode, which is not limited herein. After the user takes the commodity, the vending machine may turn off the state indicator light.

At block S140, in response to detecting purchase confirmation information fed back by the user for the commodity indication information, the user is guided to use at least one biological characteristic to finish payment for the expected commodity.

Accordingly, after the user acquires the commodity indication information provided by the vending machine, if the user confirms to purchase, then the user may feedback the purchase confirmation information for the commodity indication information to the vending machine. In order to avoid manual operations of the user, in the embodiments of the present disclosure, it is unnecessary for the user to feedback the purchase confirmation information by manually inputting or selecting. After receiving the purchase confirmation information fed back by the user, the vending machine may guide the user to use the biological characteristic to finish payment for the expected commodity, so as to avoid manual operations during the payment.

In an alternative embodiment of the present disclosure, detecting the purchase confirmation information fed back by the user for the commodity indication information may include: in response to identifying a confirmation key term based on user speech information acquired by a microphone, determining that the purchase confirmation information is detected.

As an example, the confirmation key term may include but be not limited to "confirm", "yes" or "purchase", which may be extended according to practical requirements and not limited herein.

Accordingly, the vending machine may be provided with a speech detecting device, such as a microphone, a speech recognition device or the like. After the vending machine provides the commodity indication information to the user, the vending machine may automatically turn on the microphone to detect speech of the user, if the speech recognition device recognizes the confirmation key term from the speech of the user, it indicates that the user confirms to purchase the expected commodity. In addition, the speech detecting device may further be configured to determine the expected commodity corresponding to the user. For example, the user may input the position coordinate corresponding to the expected commodity via speech output, the vending machine may directly determine the commodity corresponding to the position coordinate as the expected commodity after detecting the position coordinate in the speech.

In an alternative embodiment of the present disclosure, detecting the purchase confirmation information fed back by the user for the commodity indication information may include: in response to identifying a standard head action based on at least two frames of images of the user captured by a camera, determining that the purchase confirmation information is detected. The standard head action comprises nodding or blinking.

In embodiments of the present disclosure, the purchase confirmation information fed back by the user may also be detected by identifying a special action of the user through an image processing device. In detail, a camera may be configured in the vending machine, and the camera may capture at least two frames of images of the user. Multiple frames of images may improve the accuracy. If the standard head action (such as nodding or blinking) is identified from the multiple frames of images acquired by a background processor, it may determine that the purchase confirmation information is detected.

In an alternative embodiment of the present disclosure, guiding the user to use at least one biological characteristic to finish payment for the expected commodity may include: providing payment information corresponding to the expected commodity to the user and indicating the user to input at least two biological characteristics respectively; acquiring a target payment account corresponding to both the at least two biological characteristics, and performing based on the payment information a payment operation matching the target payment account. The biological characteristic comprises face, voice print, iris and fingerprint.

Accordingly, during the payment, the method according to the embodiments of the present disclosure may avoid manual payment of the user. In detail, the vending machine may display payment information corresponding to the expected commodity to the user in a display screen via speech broadcasting or the combination of pictures and text, and then prompt the user to input at least two biological characteristics in steps. After the user inputs at least two biological characteristics accordingly, the vending machine may acquire the target payment accounts corresponding respectively to the at least two biological characteristics. If the determined target payment accounts are identical, the payment operations such as charging may be performed on the target payment account. It should be understood that, when the user adopts the above-mentioned methods to pay, it is required to enable a biological characteristic verification function for the target payment account. The biological characteristic may include but be not limited to face, voice print, iris and fingerprint.

In the embodiments of the present disclosure, based on the gaze point of the user within the commodity displaying plane matching the vending machine determined according to the acquired images of eyes and based on the position coordinates of the commodities in the commodity displaying plane, the expected commodity corresponding to the user is determined and the matched commodity indication information is provided to the user; if the purchase confirmation information fed back by the user is detected, the user is guided to use at least one biological characteristic to finish payment for the expected commodity. In this way, the problem that the vending machine requires an inconvenient transaction procedure and a tedious payment mode is solved, hand actions of the user when operating the vending machine may be reduced to the maximum extent and a user purchase mode based on the vending machine is optimized, such that application scenarios of the vending machine may be extended to satisfy requirements of the user on the vending machine under a special application scenario.

Second Embodiment

Figure 2:
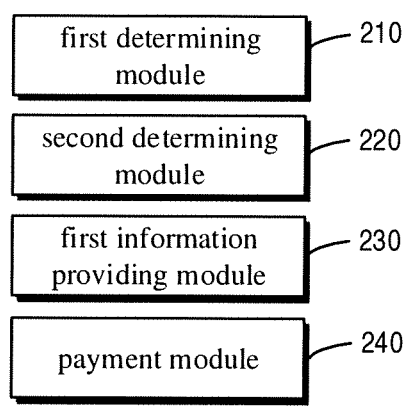
FIG. 2 is a block diagram of an apparatus for selling a commodity according to a second embodiment of the present disclosure.

FIG. 2 is a block diagram of an apparatus for selling a commodity according to the second embodiment of the present disclosure. As illustrated in FIG. 2, the apparatus includes a first determining module 210, a second determining module 220, a first information providing module 230, and a payment module 240.

The first determining module 210 is configured to acquire an image of eyes of a user and to determine based on the image of eyes a gaze point of the user within a commodity displaying plane matching a vending machine.

The second determining module 220 is configured to determine, based on position coordinates of at least two commodities in the commodity displaying plane and the gaze point, an expected commodity corresponding to the user.

The first information providing module 230 is configured to provide commodity indication information of the expected commodity to the user.

The payment module 240 is configured to, in response to detecting purchase confirmation information fed back by the user for the commodity indication information, guide the user to use at least one biological characteristic to finish payment for the expected commodity.

In the embodiments of the present disclosure, based on the gaze point of the user within the commodity displaying plane matching the vending machine determined according to the acquired images of eyes and based on the position coordinates of the commodities in the commodity displaying plane, the expected commodity corresponding to the user is determined and the matched commodity indication information is provided to the user; if the purchase confirmation information fed back by the user is detected, the user is guided to use at least one biological characteristic to finish payment for the expected commodity. In this way, the problem that the vending machine requires an inconvenient transaction procedure and a tedious payment mode is solved, hand actions of the user when operating the vending machine may be reduced to the maximum extent and a user purchase mode based on the vending machine is optimized, such that application scenarios of the vending machine may be extended to satisfy requirements of the user on the vending machine under a special application scenario.

Alternatively, the first information providing module 230 is further configured to: acquire commodity description information of the expected commodity, construct based on the commodity description information the commodity indication information and provide the commodity indication information to the user via speech broadcasting.

Alternatively, the first information providing module 230 is further configured to: determine position recognition information of a state indicator light matching the expected commodity and lighten the state indicator light matching the position recognition information to generate the commodity indication information for providing to the user.

Alternatively, the payment module 240 is further configured to: in response to identifying a confirmation key term based on user speech information acquired by a microphone, determine that the purchase confirmation information is detected.

Alternatively, the payment module 240 is further configured to: in response to identifying a standard head action based on at least two frames of images of the user captured by a camera, determine that the purchase confirmation information is detected. The standard head action comprises nodding or blinking.

Alternatively, the payment module 240 is further configured to: provide payment information corresponding to the expected commodity to the user and indicate the user to input at least two biological characteristics respectively, acquire a target payment account corresponding to both the at least two biological characteristics, and perform based on the payment information a payment operation matching the target payment account. The biological characteristic comprises face, voice print, iris and fingerprint.

The apparatus for selling a commodity according to the embodiment of the present disclosure may be configured to execute the method for selling a commodity, has the corresponding function modules to realize the same beneficial effect. Regarding details not described in this embodiment, reference may be made to the method for selling a commodity according to any embodiment of the present disclosure.

Third Embodiment

Figure 3:
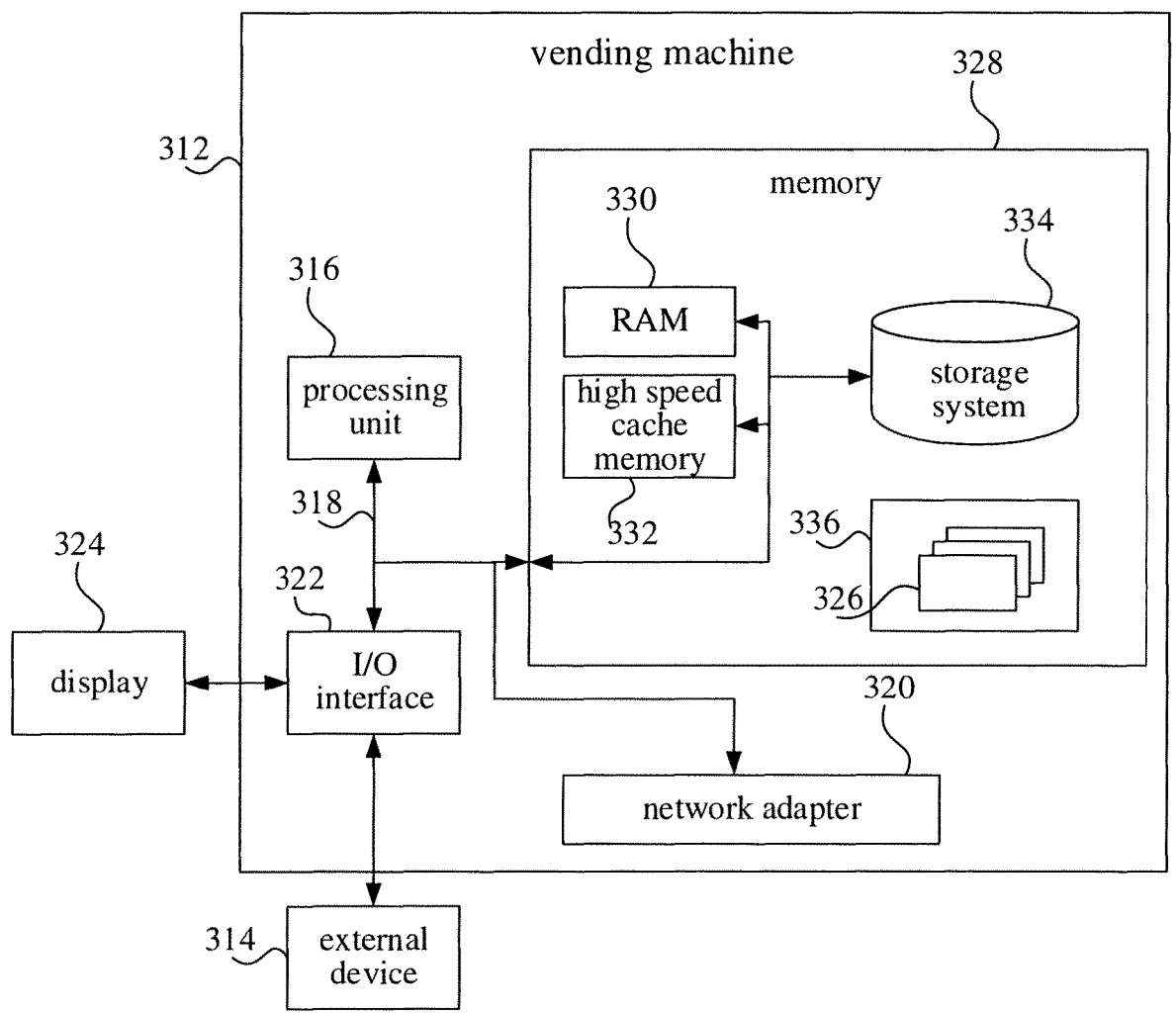
FIG. 3 is a schematic diagram of a vending machine according to a third embodiment of the present disclosure.

FIG. 3 is a block diagram of a vending machine according to the third embodiment of the present disclosure. FIG. 3 illustrates a block diagram of a vending machine 312 adapted to implement embodiments of the present disclosure. The vending machine 312 illustrated in FIG. 3 is merely an example, and cannot be interpreted as a limitation on the function and application scope of the embodiments of the present disclosure.

As illustrated in FIG. 3, the vending machine 312 is represented by a general computer device. Components of the vending machine 312 may include, but is not limited to, one or more processors or processing units 316, a system memory 328, a bus 318 connected to various system components, such as the system memory 328, the processor 316.

The bus 318 represents one or more of any of several types of bus structures, including a memory bus or a memory controller, a peripheral bus, an accelerated graphics port, a processor 16, or a local bus using any of a variety of bus structures. For example, these architectures include, but are not limited to, an Industry Standard Architecture (hereinafter referred to as ISA) bus, a Micro Channel Architecture (hereinafter referred to as MAC) bus, an enhanced ISA bus, a Video Electronics Standards Association (hereinafter referred to as VESA) local bus and Peripheral Component Interconnection (PCI) bus.

The vending machine 312 typically includes a variety of computer system readable media. These media may be any available media accessible by the vending machine 312 and includes both volatile and non-volatile media, removable and non-removable media.

The system memory 328 may include a computer system readable medium in the form of volatile memory, such as a random access memory (hereinafter referred to as RAM) 330 and/or a high speed cache memory 332. The vending machine 312 may further include other removable or non-removable, volatile or non-volatile computer system storage media. By way of example only, the storage device 334 may be configured to read and write a non-removable and non-volatile magnetic media (not shown in FIG. 3, commonly referred to as a "hard drive"). Although not shown in FIG. 3, a magnetic disk driver for reading from and writing to a removable and non-volatile magnetic disk (such as "floppy disk") and a disk driver for reading from and writing to a removable and non-volatile optical disk (such as compact disk read only memory (hereinafter referred to as CD-ROM), Digital Video Disc Read Only Memory (hereinafter referred to as DVD-ROM) or other optical media can be provided. In these cases, each driver may be connected to the bus 318 via one or more data medium interfaces. The memory 328 may include at least one program product. The program product has a set (such as, at least one) of program modules configured to perform the functions of various embodiments of the present disclosure.

A program 336 having a set (at least one) of the program modules 326 may be stored in, for example, the memory 328. The program modules 326 include but are not limited to, an operating system, one or more application programs, other programs modules, and program data. Each of these examples, or some combination thereof, may include an implementation of a network environment. The program modules 326 generally perform the functions and/or methods in the embodiments described herein.

The vending machine 312 may also communicate with one or more external devices 314 (such as, a keyboard, a pointing device, a display 324, etc.). Furthermore, the vending machine 312 may also communicate with one or more devices enabling a user to interact with the vending machine 312 and/or other devices (such as a network card, modem, etc.) enabling the vending machine 312 to communicate with one or more computer devices. This communication can be performed via the input/output (I/O) interface 322. Also, the vending machine 312 may communicate with one or more networks (such as a local area network (hereafter referred to as LAN), a wide area network (hereafter referred to as WAN) and/or a public network such as an Internet) through a network adapter 320. As shown in FIG. 3, the network adapter 320 communicates with other modules of the vending machine 312 over the bus 318. It should be understood that, although not shown in FIG. 3, other hardware and/or software modules may be used in conjunction with the vending machine 312. The hardware and/or software includes, but is not limited to, microcode, device drivers, redundant processing units, external disk drive arrays, RAID systems, tape drive and data backup storage system.

The processing unit 316 is configured to execute various functional applications and data processing by running programs stored in the system memory 328, for example, implementing the method for selling a commodity provided in embodiments of the present disclosure.

In other words, the processing unit executes the program by: acquiring an image of eyes of a user, determining based on the image of eyes a gaze point of the user within a commodity displaying plane matching a vending machine; determining, based on position coordinates of at least two commodities in the commodity displaying plane and the gaze point, an expected commodity corresponding to the user; providing commodity indication information of the expected commodity to the user; and in response to detecting purchase confirmation information fed back by the user for the commodity indication information, guiding the user to use at least one biological characteristic to finish payment for the expected commodity.

Based on the gaze point of the user within the commodity displaying plane matching the vending machine determined according to the acquired images of eyes and based on the position coordinates of the commodities in the commodity displaying plane, the expected commodity corresponding to the user is determined and the matched commodity indication information is provided to the user by the vending machine; if the purchase confirmation information fed back by the user is detected, the user is guided to use at least one biological characteristic to finish payment for the expected commodity. In this way, the problem that the vending machine requires an inconvenient transaction procedure and a tedious payment mode is solved, hand actions of the user when operating the vending machine may be reduced to the maximum extent and a user purchase mode based on the vending machine is optimized, such that application scenarios of the vending machine may be extended to satisfy requirements of the user on the vending machine under a special application scenario.

Fourth Embodiment

The fourth embodiment further provides a storage medium containing instructions executable by a computer. When the instructions are executed by a processor of the computer, the method for selling a commodity according to any embodiment of the present disclosure is performed. The method includes: acquiring an image of eyes of a user, determining based on the image of eyes a gaze point of the user within a commodity displaying plane matching a vending machine; determining, based on position coordinates of at least two commodities in the commodity displaying plane and the gaze point, an expected commodity corresponding to the user; providing commodity indication information of the expected commodity to the user; and in response to detecting purchase confirmation information fed back by the user for the commodity indication information, guiding the user to use at least one biological characteristic to finish payment for the expected commodity.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

It should be noted that the above description is merely preferred embodiments and technical principles of the present disclosure. It should be understood that the present disclosure is not limited to the specific embodiments described above. Those skilled in the art may make changes, alternatives, and modifications in the embodiments without departing from spirit, principles and scope of the present disclosure. Although explanatory embodiments have been shown and described, it would be appreciated by those skilled in the art that the above embodiments cannot be construed to limit the present disclosure, and the present disclosure may further include other equivalent embodiments without departing from spirit of the present disclosure. The scope of present disclosure is determined by the accompanying claims.

What is claimed is:

1. A method for selling a commodity, applied to a vending machine comprising an image processing device, an input/output interface and a processor, the method comprising:

acquiring, by the image processing device, an image of eyes of a user, determining by the processor based on the image of eyes a gaze point of the user within a commodity displaying plane matching the vending machine;

determining, by the processor based on position coordinates of at least two commodities in the commodity displaying plane and the gaze point, an expected commodity corresponding to the user;

providing, by the input/output interface, commodity indication information of the expected commodity to the user; and in response to detecting purchase confirmation information fed back by the user for the commodity indication information, guiding, by the processor, the user to use at least one biological characteristic acquired by the input/output interface to finish payment for the expected commodity;

wherein, guiding the user to use at least one biological characteristic to finish payment for the expected commodity comprises:

providing, by the input/output interface, payment information corresponding to the expected commodity to the user and indicating the user to input at least two biological characteristics respectively through the input/output interface;

acquiring, by the processor, target payment accounts corresponding respectively to the at least two biological characteristics, and performing, by the processor, based on the payment information a payment operation matching in response to determining that target payment accounts corresponding respectively to the at least two biological characteristics are identical;

wherein the biological characteristic comprises face, voice print, iris and fingerprint;

wherein detecting the purchase confirmation information fed back by the user for the commodity indication information comprises:

in response to identifying a standard head action based on at least two frames of images of the user captured by a camera, determining that the purchase confirmation information is detected;

wherein the standard head action comprises nodding or blinking;

wherein providing the commodity indication information of the expected commodity to the user comprises:

determining position recognition information of a state indicator light matching the expected commodity; and flickering the state indicator light matching the position recognition information to generate the commodity indication information for providing to the user.

2. The method of claim 1, wherein, providing the commodity indication information of the expected commodity to the user comprises:

acquiring commodity description information of the expected commodity, constructing based on the commodity description information the commodity indication information; and providing the commodity indication information to the user via speech broadcasting.

3. The method of claim 1, wherein, detecting the purchase confirmation information fed back by the user for the commodity indication information comprises:

in response to identifying a confirmation key term based on user speech information acquired by a microphone, determining that the purchase confirmation information is detected.

4. A vending machine, comprising:
an image processing device;
an input/output interface;
one or more processors;
a memory for storing one or more programs;
wherein when the one or more programs are executed by the one or more processors, the vending machine is one or more processors are caused to perform the method for selling a commodity, comprising:

acquiring, by the image processing device, an image of eyes of a user, determining by the one or more processors based on the image of eyes a gaze point of the user within a commodity displaying plane matching the vending machine;

determining, by the one or more processors based on position coordinates of at least two commodities in the commodity displaying plane and the gaze point, an expected commodity corresponding to the user;

providing, by the input/output interface, commodity indication information of the expected commodity to the user; and in response to detecting purchase confirmation information fed back by the user for the commodity indication information, guiding, by the processor, the user to use at least one biological characteristic acquired by the input/output interface to finish payment for the expected commodity;

wherein, guiding the user to use at least one biological characteristic to finish payment for the expected commodity comprises:

providing payment information corresponding to the expected commodity to the user and indicating the user to input at least two biological characteristics respectively;

acquiring target payment accounts corresponding respectively to the at least two biological characteristics, and performing based on the payment information a payment operation matching in response to determining that target payment accounts corresponding respectively to the at least two biological characteristics are identical;

wherein the biological characteristic comprises face, voice print, iris and fingerprint;

wherein detecting the purchase confirmation information fed back by the user for the commodity indication information comprises:

in response to identifying a standard head action based on at least two frames of images of the user captured by a camera, determining that the purchase confirmation information is detected;

wherein the standard head action comprises nodding or blinking;

wherein providing the commodity indication information of the expected commodity to the user comprises:

determining position recognition information of a state indicator light matching the expected commodity; and flickering the state indicator light matching the position recognition information to generate the commodity indication information for providing to the user.

5. The vending machine of claim 4, wherein, providing the commodity indication information of the expected commodity to the user comprises:

acquiring commodity description information of the expected commodity, constructing based on the commodity description information the commodity indication information; and providing the commodity indication information to the user via speech broadcasting.

6. The vending machine of claim 4, wherein, detecting the purchase confirmation information fed back by the user for the commodity indication information comprises:

in response to identifying a confirmation key term based on user speech information acquired by a microphone, determining that the purchase confirmation information is detected.

7. A computer-readable storage medium having a computer program stored thereon, wherein, when the computer program is executed by a processor of a vending machine comprising an image processing device and an input/output interface, the processor performs the method for selling a commodity, comprising:

acquiring, by the image processing device, an image of eyes of a user, determining by the processor based on the image of eyes a gaze point of the user within a commodity displaying plane matching the vending machine;

determining, by the processor based on position coordinates of at least two commodities in the commodity displaying plane and the gaze point, an expected commodity corresponding to the user;

providing, by the input/output interface, commodity indication information of the expected commodity to the user; and in response to detecting purchase confirmation information fed back by the user for the commodity indication information, guiding, by the processor, the user to use at least one biological characteristic acquired by the input/output interface to finish payment for the expected commodity;

wherein, guiding the user to use at least one biological characteristic to finish payment for the expected commodity comprises:

providing, by the input/output interface, payment information corresponding to the expected commodity to the user and indicating the user to input at least two biological characteristics respectively through the input/output interface;

acquiring, by the processor, target payment accounts corresponding respectively to the at least two biological characteristics, and performing, by the processor, based on the payment information a payment operation matching in response to determining that target payment accounts corresponding respectively to the at least two biological characteristics are identical;

wherein the biological characteristic comprises face, voice print, iris and fingerprint;

wherein detecting the purchase confirmation information fed back by the user for the commodity indication information comprises:

in response to identifying a standard head action based on at least two frames of images of the user captured by a camera, determining that the purchase confirmation information is detected;

wherein the standard head action comprises nodding or blinking;

wherein providing the commodity indication information of the expected commodity to the user comprises:

determining position recognition information of a state indicator light matching the expected commodity; and flickering the state indicator light matching the position recognition information to generate the commodity indication information for providing to the user.

8. The storage medium of claim 7, wherein, providing the commodity indication information of the expected commodity to the user comprises:

acquiring commodity description information of the expected commodity, constructing based on the commodity description information the commodity indication information; and providing the commodity indication information to the user via speech broadcasting.

9. The storage medium of claim 7, wherein, detecting the purchase confirmation information fed back by the user for the commodity indication information comprises:

in response to identifying a confirmation key term based on user speech information acquired by a microphone, determining that the purchase confirmation information is detected.

* * * * *